(12) United States Patent
Takada et al.

(10) Patent No.: US 11,791,599 B2
(45) Date of Patent: Oct. 17, 2023

(54) ELECTRIC CABLE WITH TERMINAL AND METHOD FOR MANUFACTURING ELECTRIC CABLE WITH TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kotaro Takada, Mie (JP); Osamu Nakayama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/679,918

(22) Filed: Feb. 24, 2022

(65) Prior Publication Data

US 2022/0181831 A1 Jun. 9, 2022

Related U.S. Application Data

(63) Continuation of application No. 16/231,737, filed on Dec. 24, 2018, now abandoned.

(30) Foreign Application Priority Data

Dec. 28, 2017 (JP) .................................. 2017-253935

(51) Int. Cl.
*H01R 43/02* (2006.01)
*B23K 20/10* (2006.01)
(Continued)

(52) U.S. Cl.
CPC ....... *H01R 43/0207* (2013.01); *B23K 20/004* (2013.01); *B23K 20/10* (2013.01);
(Continued)

(58) Field of Classification Search
CPC ................ H01R 43/0207; H01R 4/023; H01R 43/0228; H01R 43/02; B23K 20/004;
(Continued)

(56) References Cited

U.S. PATENT DOCUMENTS 3,717,842 A 2/1973 Douglas, Jr.
9,246,292 B2 1/2016 Tachibana
(Continued)

FOREIGN PATENT DOCUMENTS

JP 2006-107882 4/2006

*Primary Examiner* — Harshad C Patel
(74) *Attorney, Agent, or Firm* — GREENBLUM & BERNSTEIN, P.L.C.

(57) ABSTRACT

An electric cable includes a terminal, and a manufacture method thereof is to suppress shedding of wire strands from a core wire. The electric cable with terminal includes an end of an electric cable connected to the terminal. The electric cable includes a core wire that is a bundle of a plurality of wire strands. The terminal includes a connection portion in which the core wire is exposed at the end of the electric cable. The core wire is placed on the connection portion including a welded portion that is to be ultrasonic welded to the connection portion. The welded portion includes a high compression portion in which the core wire is compressed, and a low compression portion in which a position that is closer than the high compression portion to the end of the core wire is compressed at a compression lower than that of the high compression portion.

6 Claims, 17 Drawing Sheets

(51) Int. Cl.
*H01R 4/02* (2006.01)
*B23K 20/233* (2006.01)
*B23K 20/00* (2006.01)
*B23K 33/00* (2006.01)
*B23K 20/24* (2006.01)
*B23K 101/32* (2006.01)
*B23K 101/38* (2006.01)
*B23K 103/10* (2006.01)
*B23K 103/18* (2006.01)
*B23K 103/12* (2006.01)

(52) U.S. Cl.
CPC ........ *B23K 20/106* (2013.01); *B23K 20/2333* (2013.01); *B23K 20/2336* (2013.01); *B23K 20/24* (2013.01); *B23K 33/00* (2013.01); *H01R 4/023* (2013.01); *H01R 43/0228* (2013.01); *B23K 2101/32* (2018.08); *B23K 2101/38* (2018.08); *B23K 2103/10* (2018.08); *B23K 2103/12* (2018.08); *B23K 2103/18* (2018.08)

(58) Field of Classification Search
CPC .. B23K 20/10; B23K 20/106; B23K 20/2333; B23K 20/2336; B23K 20/24; B23K 33/00; B23K 2103/18; B23K 2103/10; B23K 2103/12; B23K 2101/38
See application file for complete search history.

(56) References Cited

U.S. PATENT DOCUMENTS

| | | |
|---|---|---|
| 9,394,588 B2 | 7/2016 | Matsuo |
| 9,444,212 B2 * | 9/2016 | Tachibana ................ H01R 4/62 |
| 9,520,668 B2 | 12/2016 | Schmidt |
| 10,033,146 B2 | 7/2018 | Tachibana |
| 10,833,427 B2 | 11/2020 | Sato |
| 10,879,661 B2 | 12/2020 | Nabeta |
| 2011/0094797 A1 | 4/2011 | Otsuka |
| 2016/0264533 A1 | 9/2016 | Nomura |
| 2019/0165492 A1 | 5/2019 | Warashina |
| 2019/0165493 A1 | 5/2019 | Warashina |
| 2019/0165532 A1 | 5/2019 | Sato |
| 2019/0165535 A1 | 5/2019 | Sato |
| 2020/0350708 A1 | 11/2020 | Hasui |

* cited by examiner

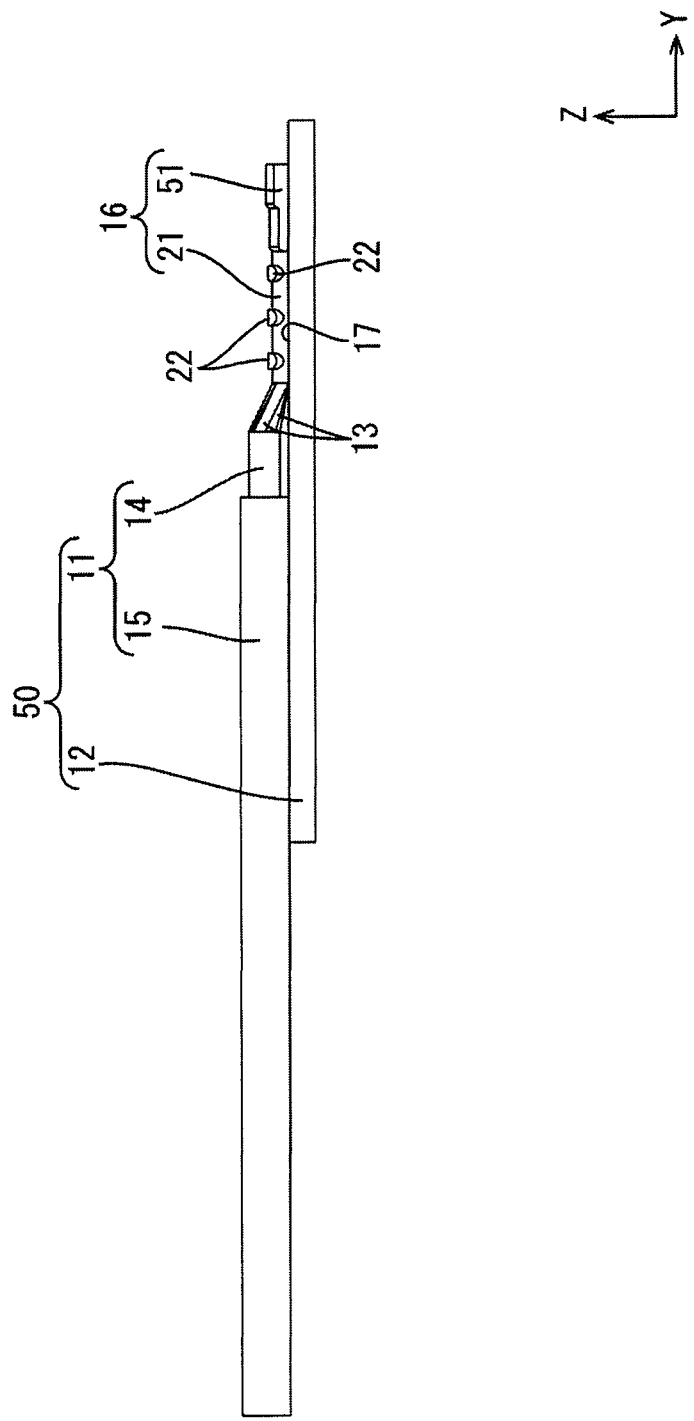

ELECTRIC CABLE WITH TERMINAL AND METHOD FOR MANUFACTURING ELECTRIC CABLE WITH TERMINAL

CROSS-REFERENCE TO RELATED APPLICATIONS

The present application is a Continuation of U.S. application Ser. No. 16/231,737, filed Dec. 24, 2018, which claims priority to Japanese Application No. JP 2017-253935, filed Dec. 28, 2017. The entire disclosure and contents of each of these applications are hereby incorporated by reference herein in entirety.

TECHNICAL FIELD

The present specification relates to a technique for ultrasonic welding of an electric cable and a terminal.

BACKGROUND ART

JP 2006-107882A discloses ultrasonic welding that is used as a conventional method for bonding a terminal with a core wire of an electric cable. In order to weld the core wire and the terminal through ultrasonic welding, a cable connection portion of the terminal is placed on an anvil, an end of the electric cable is stripped to expose the core wire, which is placed on the upper surface of the cable connection portion. Next, the core wire on the cable connection portion is pressed with a horn, the core wire and the terminal are sandwiched between the anvil and the horn, and ultrasonic vibration is applied to weld the core wire to the electric cable of the terminal.

JP 2006-107882A is an example of prior art.

SUMMARY OF THE APPLICATION

Problem to be Solved

There are cases where the leading end of the core wire protrudes from the horn when welding the core wire and the terminal. There are concerns that if the core wire is a stranded wire formed by twisting a plurality of metal wire strands (bare wires), then the wire strands that constitute the portion of the core wire that protrudes from the horn may be cut by pressure received from the horn. In such a case, the cut wire strands are shed from the terminal and problems may occur such as the cut wire strands connecting with other members.

The technique disclosed in the present specification has been completed based on circumstances such as those described above, and an object thereof is to provide an electric cable with a terminal that suppresses the shedding of wire strands, and a method for manufacturing the electric cable with terminal.

Means to Solve the Problem

The present specification discloses an electric cable with terminal wherein an end of an electric cable is connected to a terminal, wherein the electric cable comprises a core wire that is a bundle of a plurality of wire strands, wherein the terminal comprises a connection portion that is connected to the core wire that is exposed at the end of the electric cable, wherein the core wire, which is placed on the connection portion, comprises a welded portion that is ultrasonic welded to the connection portion, and wherein the welded portion comprises a high compression portion where the core wire is compressed, and a low compression portion where a position that is closer to the end of the core wire than the high compression portion is compressed at a compression that is lower than that of the high compression portion.

Also, the present specification discloses a method for manufacturing an electric cable with terminal comprising placing a core wire of an electric cable that has a bundle of a plurality of wire strands on a connection portion of the electric cable with terminal, sandwiching the connection portion on which the core wire is placed between a horn and an anvil and applying ultrasonic vibration, forming a high compression portion in the core wire by applying comparatively high pressure, and forming a low compression portion in the core wire by applying comparatively low pressure at a position that is closer to the end of the core wire than the high compression portion.

With this configuration, the core wire is firmly connected to the terminal in the high compression portion. Also, in the low compression portion, the core wire is welded in a state in which less pressure is applied than in the high compression portion. Through this, as a result of the wire strands being welded together, even if one wire strand breaks in the low compression portion, the shedding of wire strands from the core wire can be suppressed because it is welded to the other wire strands.

The following configurations are preferred embodiments of the technique disclosed in the present specification.

It is preferable that the compression of the low compression portion is continuously reduced with increasing distance from the high compression portion.

According to the above configuration, the pressure applied to the core wire between the high compression portion and the low compression portion gradually changes. Through this, the shedding of the wire strands can be further suppressed by also suppressing the breaking of the wire strands in the border region of the high compression portion and the low compression portion.

It is preferable that the compression of the low compression portion is reduced stepwise with increasing distance from the high compression portion. Through this, the shedding of the wire strands can be further suppressed by suppressing the breaking of the wire strands in the low compression portion.

It is preferable that the end of the core wire that is placed on the connection portion is held by a core wire positioning portion from a direction that intersects the direction in which the horn presses down the core wire. Through this, it is possible to position the core wire when ultrasonic welding the core wire and the terminal.

It is preferable that the outer periphery of the core wire is covered by an insulating coating, and in a state in which the core wire is placed on the connection portion, the insulating coating is held by an insulating coating positioning portion from a direction that intersects the direction in which the horn presses the core wire. According to the above configuration, it is possible to accurately position the core wire when ultrasonic welding the core wire and the terminal because it is also possible to position the portion of the core wire that is covered by the insulating coating.

Effect of the Application

With the technique disclosed in the present specification, it is possible to suppress the shedding of wire strands.

BRIEF DESCRIPTION OF THE DRAWINGS

FIG. 17 is a side view showing the electric cable with terminal.

EMBODIMENTS OF THE APPLICATION

First Embodiment

Figure 1:
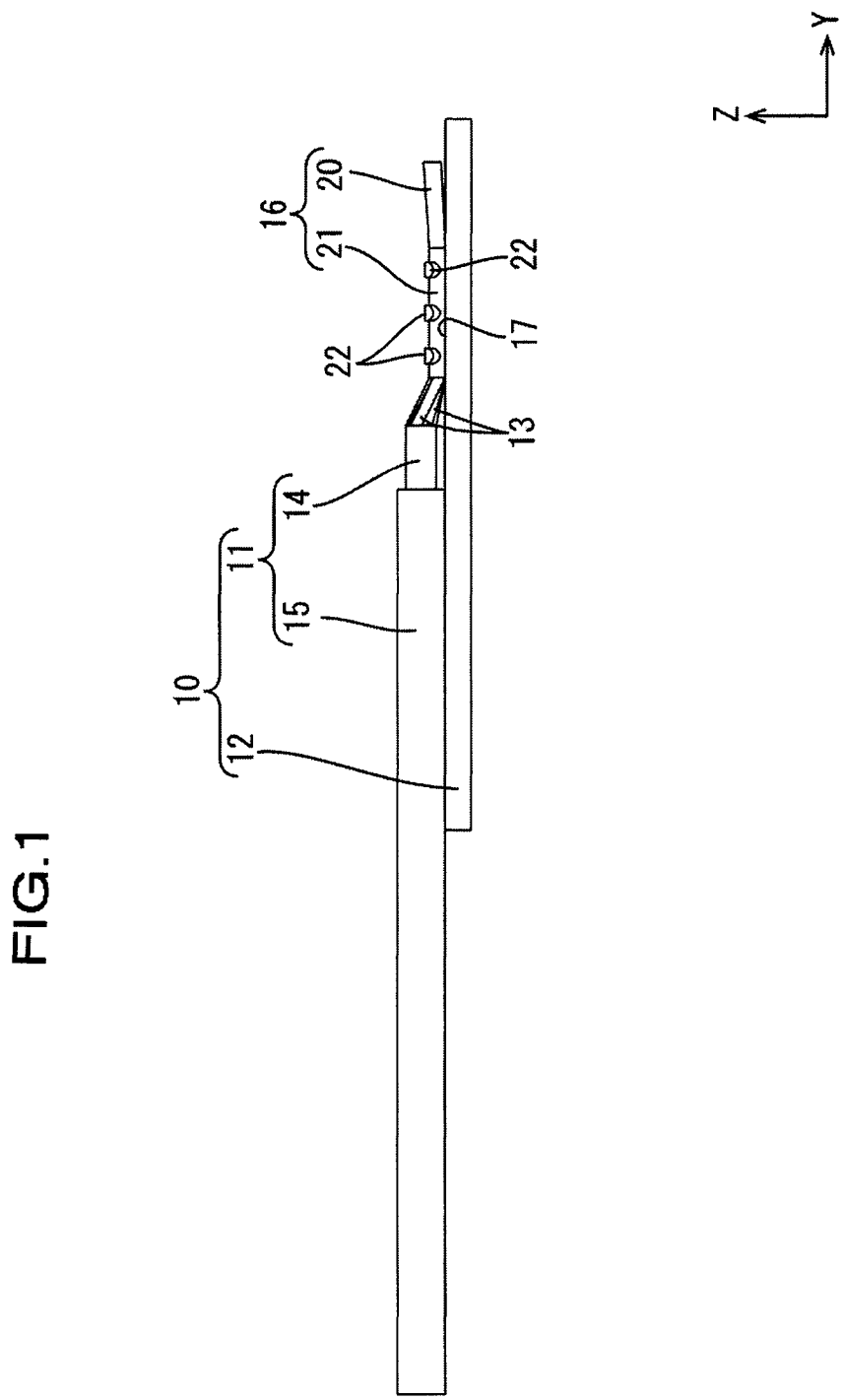
FIG. 1 is a side view diagram showing the electric cable with terminal according to a first embodiment.

The following describes a first embodiment of the technique disclosed in the present specification with reference to FIGS. 1 to 13. An electric cable with terminal 10 according to the present embodiment has an electric cable 11 and a terminal 12 that is connected to an end of the electric cable 11. In the description below, the Z direction is upward, the Y direction is forward, and the X direction is rightward. Also, a plurality of the same members are denoted by a reference numeral of one of the members only, and there are instances in which other members have their reference numerals omitted.

1. Electric Cable 11

Figure 2:
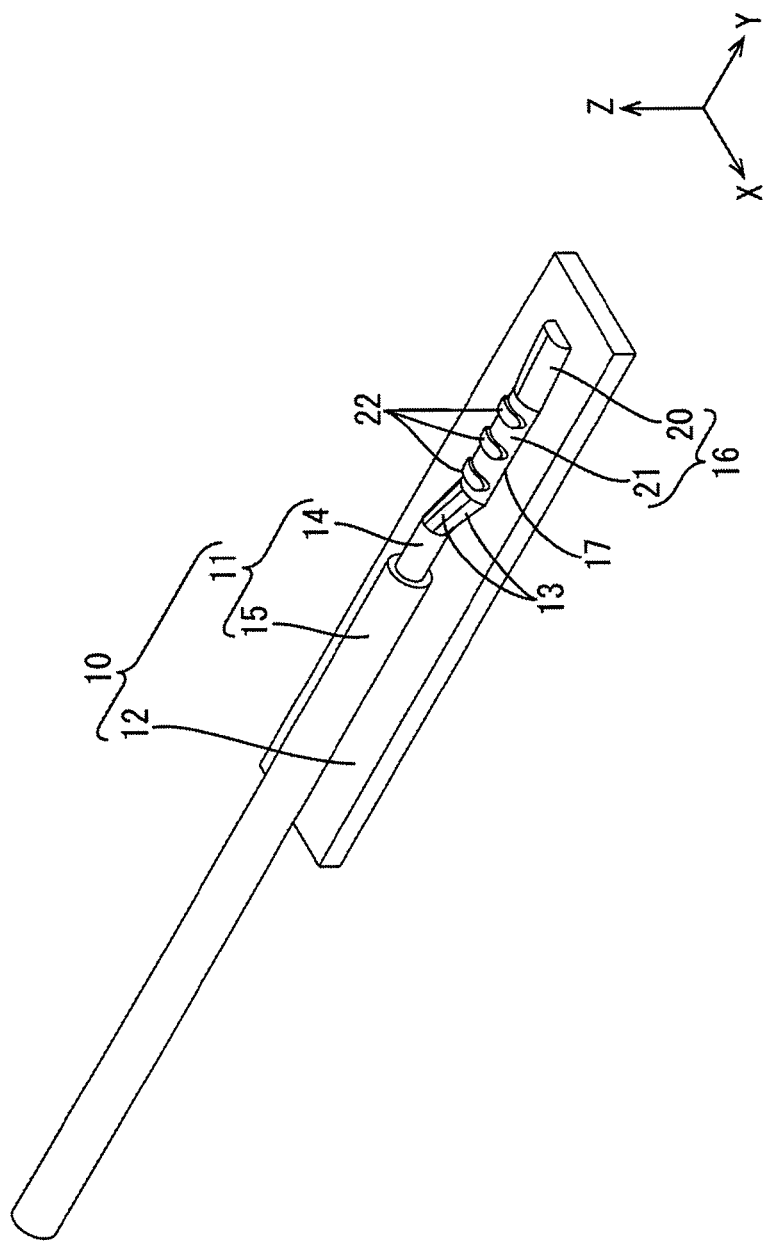
FIG. 2 is a perspective view diagram showing the electric cable with terminal.
Figure 3:
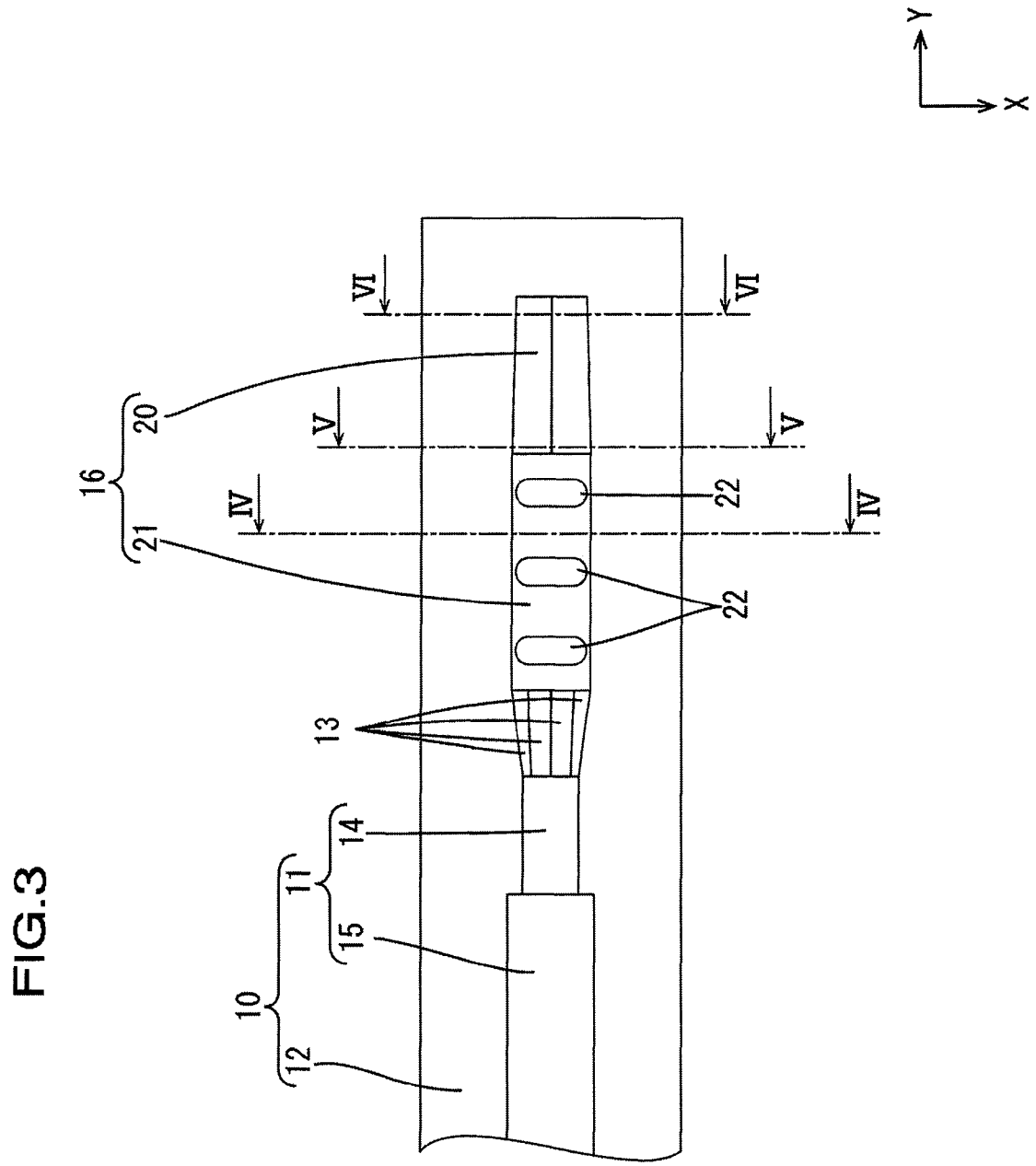
FIG. 3 is a plan view showing the electric cable with terminal.

As shown in FIGS. 1 to 3, the electric cable 11 includes a core wire 14 that made by twisting a plurality of metal wire strands (bare wires) 13, and a synthetic resin insulating coating 15 that covers the outer periphery of the core wire 14. A segment of a bundle of the plurality of the wire strands 13 includes an inclined portion continuously and obliquely inclined with respect to a longitudinal direction of the terminal 12, as shown in an illustrative example in FIG. 1. The cross-sectional shape of the core wire 14 and the cross-sectional shape of the electric cable 11 are both circular. The core wire 14 is exposed at an end of the electric cable 11 due to the insulating coating 15 having been stripped. The metal that constitutes the core wire 14 can be any metal that is suitably selected according to need, such as copper, a copper alloy, aluminum, an aluminum alloy, and the like.

2. Terminal 12

The exposed core wire 14 is ultrasonic welded to a connection portion 17 of the terminal 12. The terminal 12 is formed by punching a metal plate into a predetermined shape. The terminal 12 according to the present embodiment has a rectangular shape when seen from above. The terminal 12 can have any shape as needed. The metal that constitutes the terminal 12 can be any metal that is suitably selected according to need, such as copper, a copper alloy, aluminum, an aluminum alloy, and the like.

The metal that constitutes the core wire 14 and the metal that constitutes the terminal 12 may be the same metal, or may be different metals. Any combination of the metal that constitutes the core wire 14 and the metal that constitutes that terminal 12 can be selected. For example, a copper alloy core wire 14 and a copper alloy terminal 12 may be connected, or an aluminum alloy core wire 14 and an aluminum alloy terminal 12 may be connected. Also, an aluminum alloy core wire 14 and a copper alloy terminal 12 may be connected, or a copper alloy core wire 14 and an aluminum alloy terminal 12 may be connected.

The terminal 12 includes the connection portion 17 to which the core wire 14 of the electric cable 11 is connected through welding. The core wire 14 is connected to the connection portion 17 through a well known technique such as ultrasonic welding, low resistance welding, or the like. In the present embodiment, the core wire 14 is ultrasonic welded to the connection portion 17.

In a state in which the core wire 14 is placed on the connection portion 17 of the terminal 12, the core wire 14 and the terminal 12, are welded by applying ultrasonic vibration to the core wire 14 and the terminal 12 when they are clamped and compressed between an anvil 18 and a horn 19, which will be described later (see FIG. 10).

3. Welded Portion 16

As shown in FIG. 3, the portion of the core wire 14 that is welded to the connection portion 17 is the welded portion 16. The welded portion 16 is formed in a position towards an end of the core wire 14, and has a low compression portion 20 that is welded in a state of comparatively low compression, and a high compression portion 21 is formed in a position that is more toward the insulating coating 15 than the low compression portion 20, while also lying rearward of the low compression portion 20. In the high compression portion 21, the core wire 14 is welded in a state of higher compression than that of the low compression portion 20. The low compression portion 20 includes an inclined portion continuously and obliquely inclined with respect to the longitudinal direction of the terminal 12, as shown in an illustrative example in FIG. 1.

4. High Compression Portion 21

A plurality of protrusions 22 (three in the present embodiment) that protrude upward are formed with spaces between them and are aligned in the longitudinal direction on the upper side of the high compression portion 21. The protrusions 22 extend elongated in the lateral direction.

Figure 4:
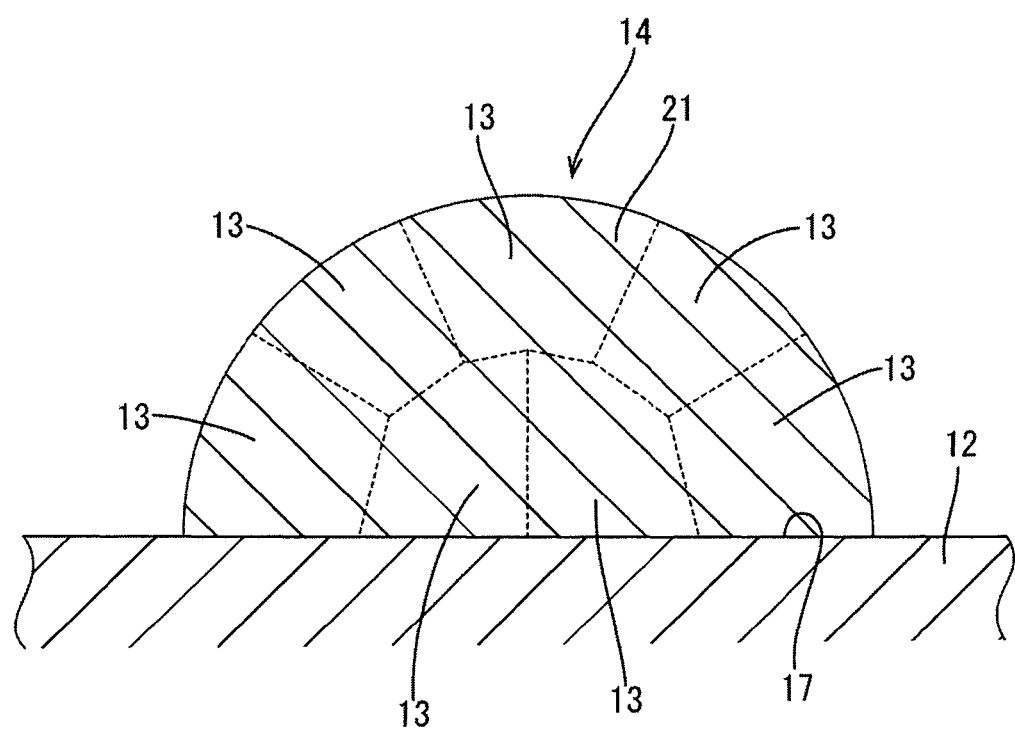
FIG. 4 is a sectional view taken along line IV-IV in FIG. 3.

As shown in FIG. 4, in the high compression portion 21, the plurality of wire strands 13 are formed into a single body through welding. The boundary between individual wire strands 13 is undefined. The cross-sectional shape of the high compression portion 21 is similar to that of a groove 23 of the horn 19, which will be described later. In the present embodiment, the cross-sectional shape of the high compression portion 21 is semi-circular.

5. Low Compression Portion 20

As shown in FIG. 1, the low compression portion 20, when viewed from the side, gradually expands in the direction from the high compression portion 21 towards the end of the core wire 14. The core wire 14 and the connection portion 17 may be separated in the end of the core wire 14 of the low compression portion 20.

Figure 5:
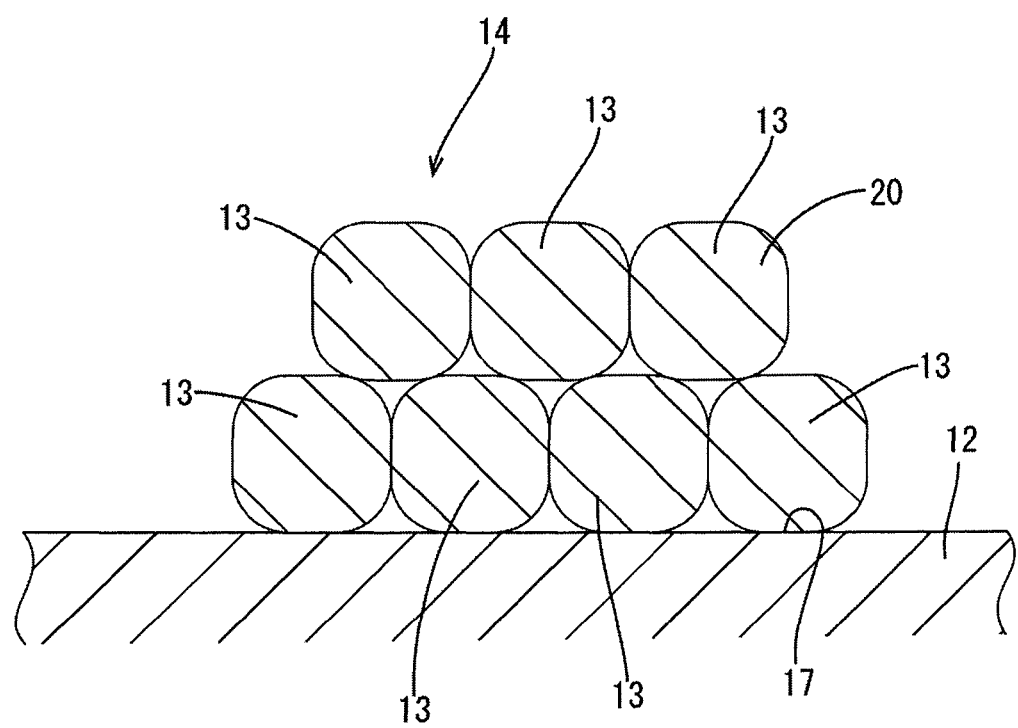
FIG. 5 is a sectional view taken along line V-V in FIG. 3.

The portion of the low compression portion 20 that is close to the high compression portion 21 is in a state of low compression that is lower than that of the high compression portion 21 as well is in a state of high compression that is higher than that of the portion toward the end of the core wire 14. As shown in FIG. 5, in the portion of the low compression portion 20 that is close to the high compression portion 21, the plurality of the wire strands 13 do not form a single body, but are separated from one another. The wire strands 13 may have portions that are welded together, and may have portions that are separated from one another. The outer shape of the wire strands 13 is deformed due to compression of the wire strands 13 by the horn 19. In the present embodiment, the cross-sectional shape of the wire strands 13 is square with rounded corners.

Figure 6:
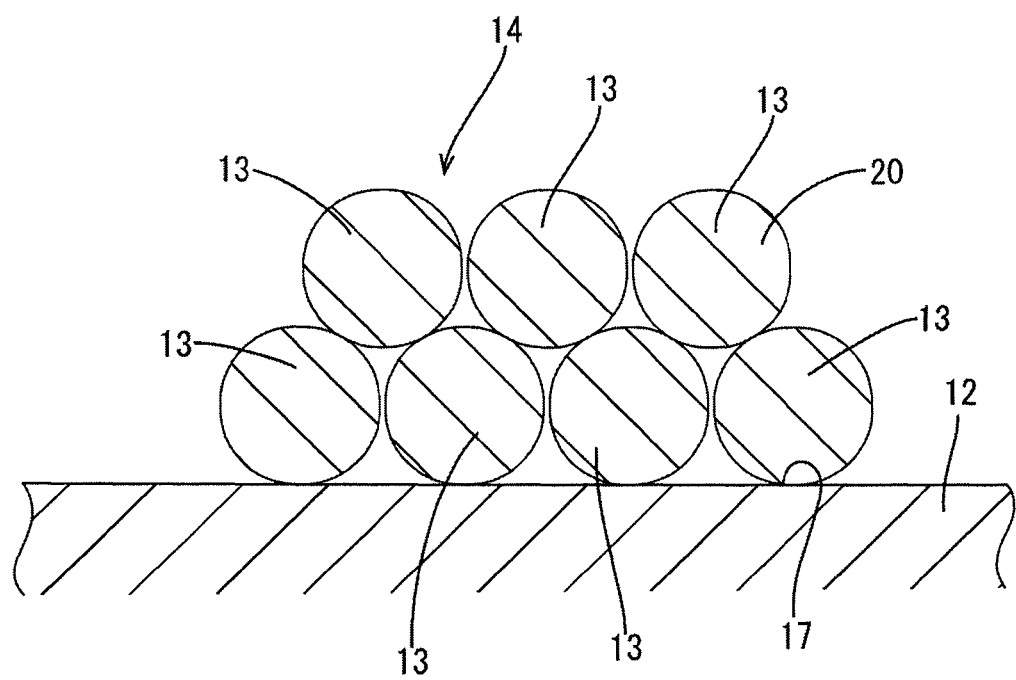
FIG. 6 is a sectional view taken along line VI-VI in FIG. 3.

As shown in FIG. 6, in the portion of the low compression portion 20 that is toward an end of the core wire 14, the cross-sectional shape of the wire strands 13 is circular. The wire strands 13 may have portions that are mutually welded together, and may have portions that are separated from each other.

6. Anvil 18

Figure 7:
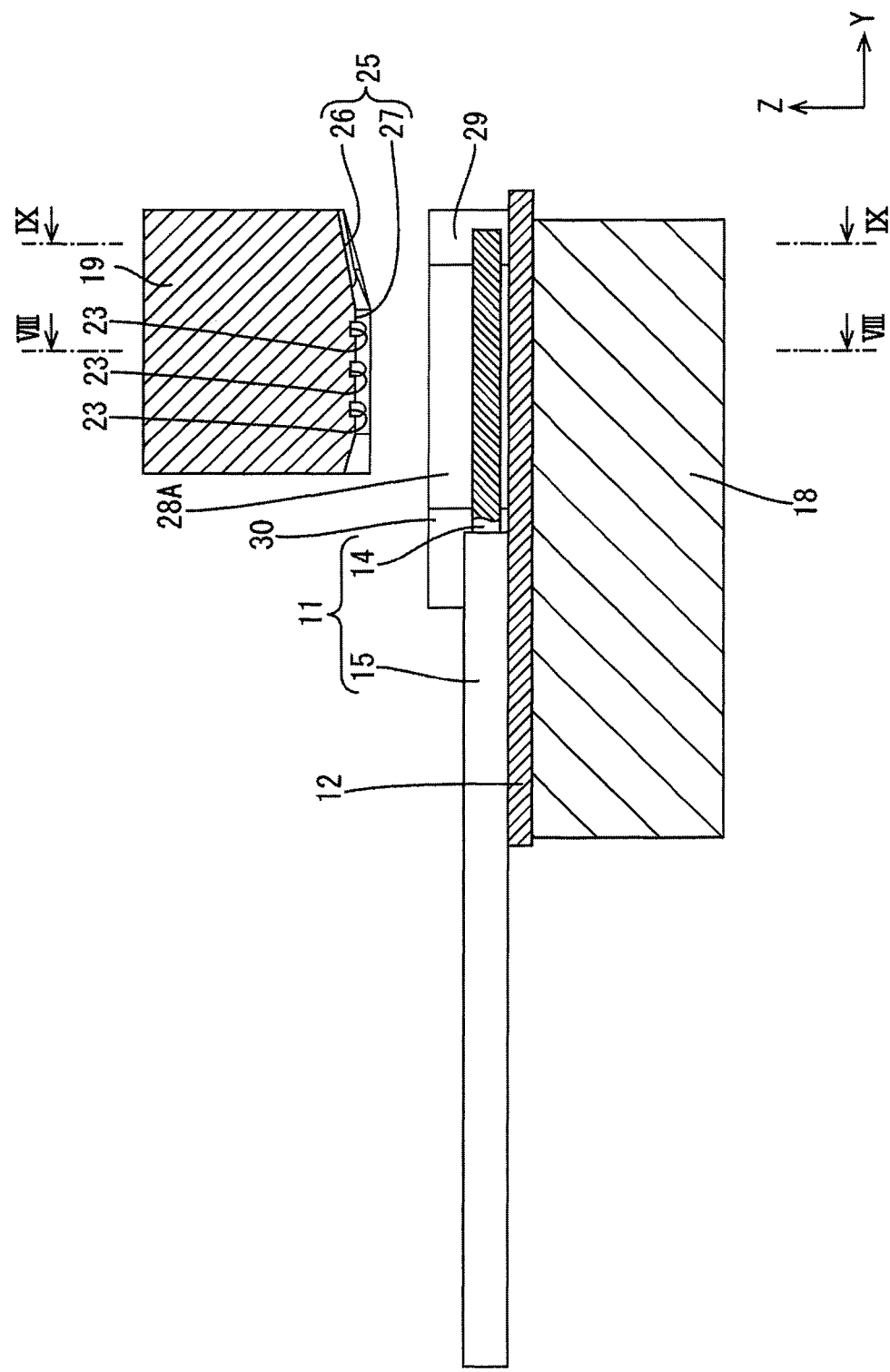
FIG. 7 is a sectional view showing a state in which the terminal and the electric cable are placed on an anvil.

As shown in FIG. 7, the anvil 18 is fixed to the apparatus body of an ultrasonic welding apparatus (not shown). The terminal 12 is placed on an upper surface of the anvil 18. Anti-slip structures such as grooves, protrusions, or recesses may be formed in the upper surface of the anvil 18 in order to keep the terminal 12 from slipping.

7. Horn 19

The horn 19 is attached to the apparatus body of the ultrasonic welding apparatus in such a way that it can be moved vertically with respect to the anvil 18. The horn 19 is formed to have an almost cuboid shape. The length in the longitudinal direction of the horn 19 is the same as or slightly shorter than the length of the core wire 14 that is exposed from the insulating coating 15. Note that the length in longitudinal direction of the horn 19 is the same as or slightly longer than the length of the core wire 14 that is exposed from the insulating coating 15.

Figure 13:
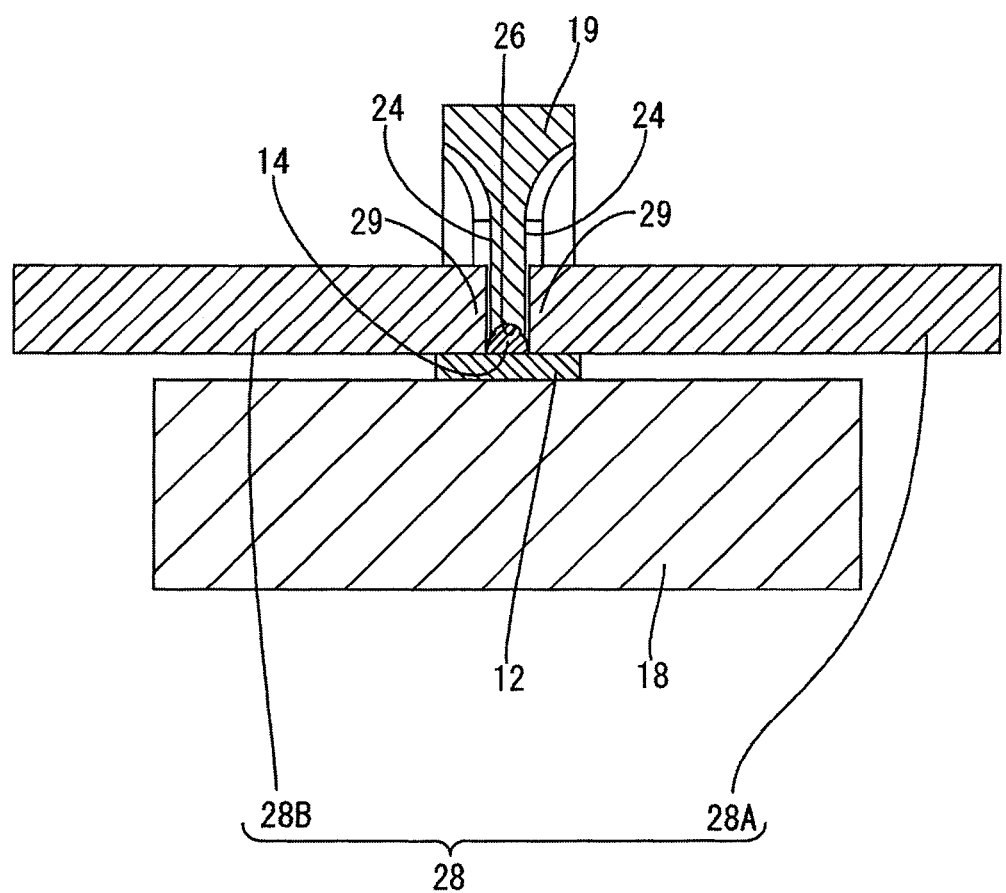
FIG. 13 is a sectional view taken along line XIII-XIII in FIG. 10.

As shown in FIG. 13, the portion toward the front end of the horn 19 has avoidance recesses 24 for the purpose of avoiding interference with a positioning jig that will be described later, the avoidance recesses 24 being formed as inward depressions in the lateral direction.

Figure 8:
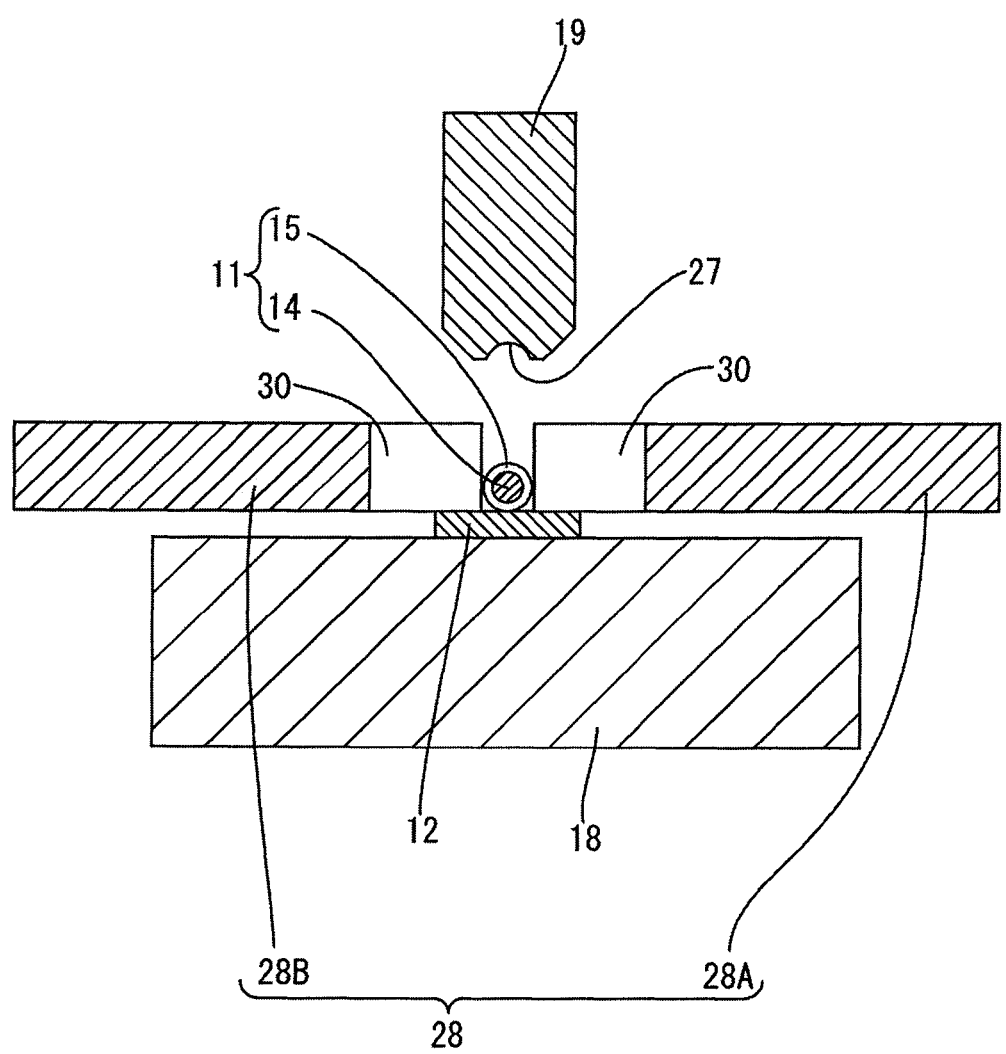
FIG. 8 is a sectional view taken along line VIII-VIII in FIG. 7.

As shown in FIG. 8, a recess 25 is formed extending in the longitudinal direction and is depressed upward in the lower surface of the horn 19. The cross-sectional shape of the recess 25 is approximately semi-circular in a plane that is perpendicular to the direction in which the electrical cable 11 extends (longitudinal direction).

As shown in FIG. 7, the recess 25 has a low-pressure application portion 26 that extends rearward from the front end of the recess, and a high-pressure application portion 27 that is formed rearward of the low-pressure application portion 26. The upper surface of the low-pressure application portion 26 is formed such that it slopes upward in the frontward direction.

The high-pressure application portion 27 is formed extending in the longitudinal direction in a position that is rearward of the low-pressure application portion 26. The height in the vertical direction of the high-pressure application portion 27 is set to be the same as that of the rear end of the low-pressure application portion 26.

A plurality (three in the present embodiment) of grooves 23 are formed in the upper surface of the high-pressure application portion 27, spaced apart in the longitudinal direction. The grooves 23 extend in the lateral direction along the inner surface of the high compression portion. The protrusions 22 are formed in the upper surface of the core wire 14 by pressing the core wire 14 into the grooves 23.

8. Positioning Jig 28

Figure 11:
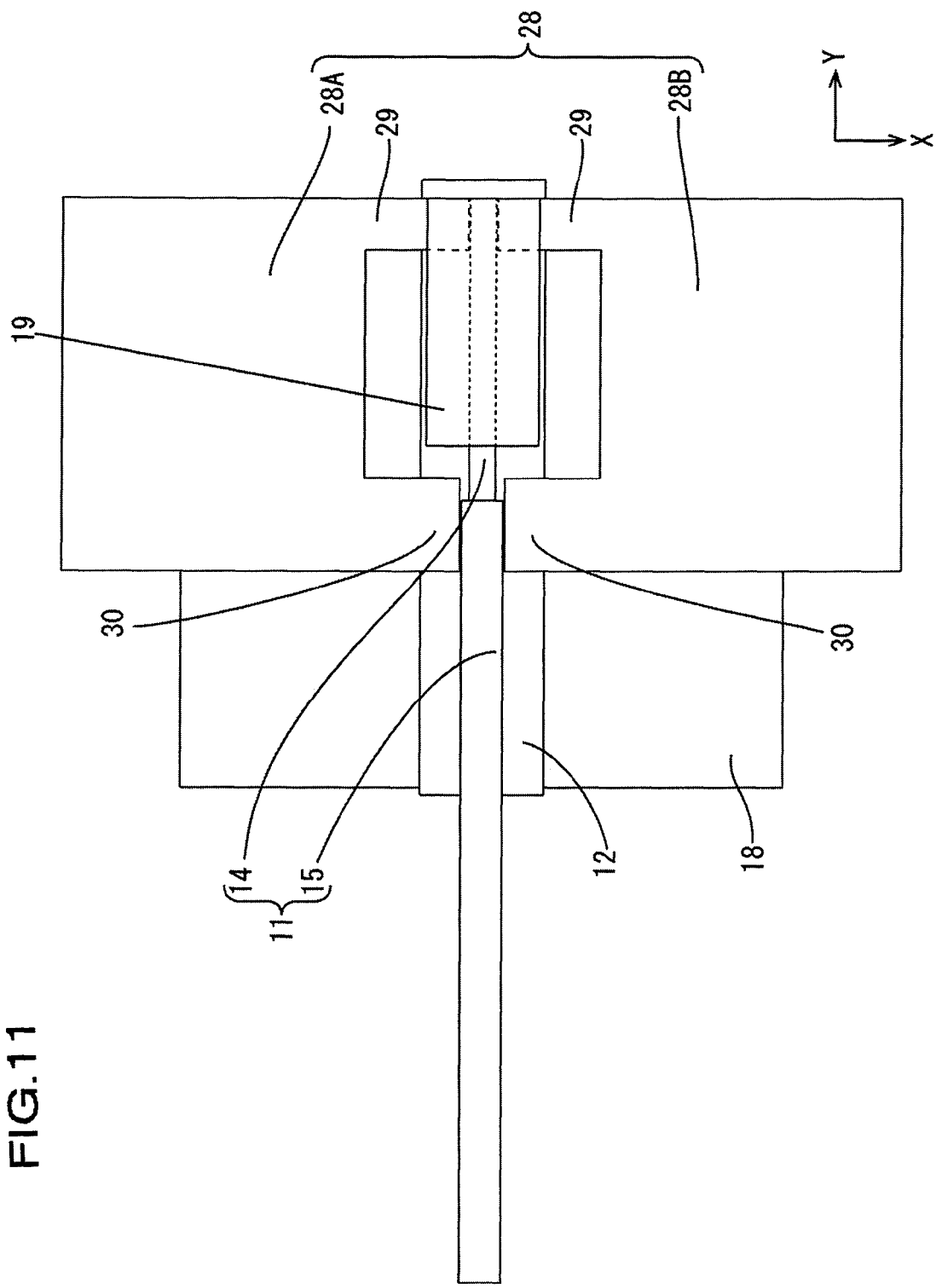
FIG. 11 is a plan view showing a state in which the core wire and the terminal are being ultrasonic welded.
Figure 12:
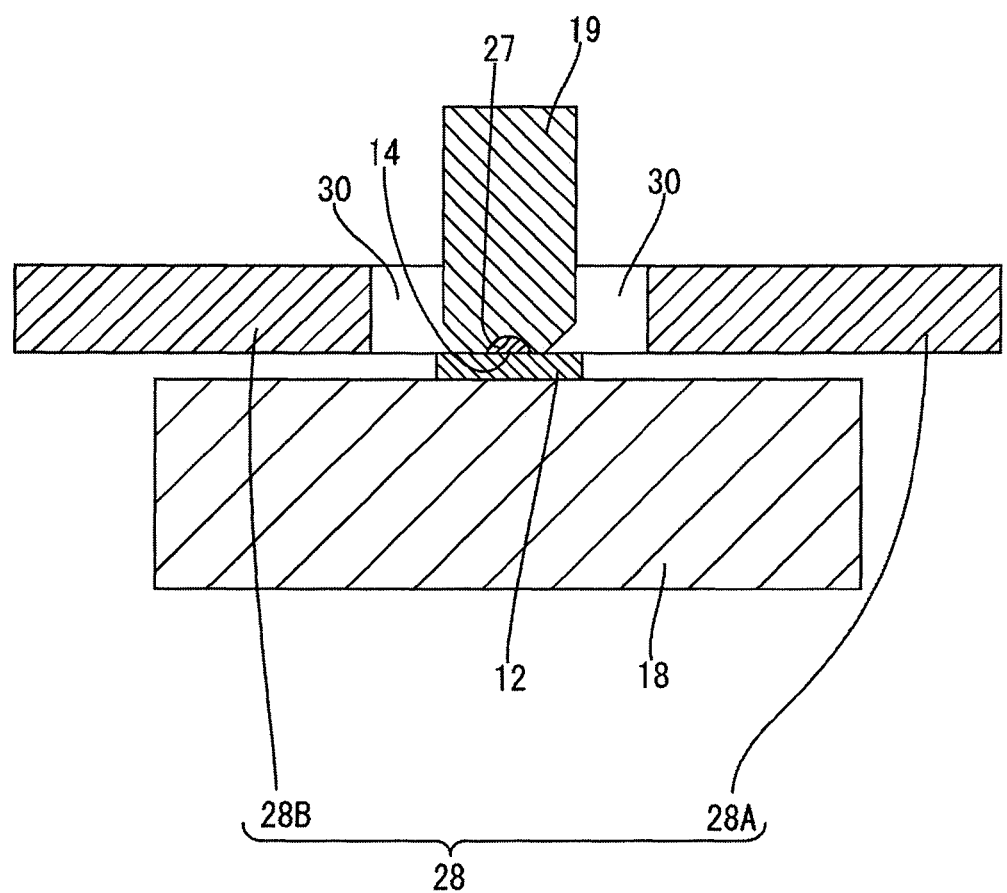
FIG. 12 is a sectional view taken along line XII-XII in FIG. 10.

As shown in FIG. 11, a positioning jig 28 is mounted to an ultrasonic welding apparatus in such a way that it can be moved to the left and right. The positioning jig 28 has a left jig 28A and a right jig 28B that are left-right symmetrical (i.e. symmetrical with respect to the lateral direction). Core wire positioning portions 29 are formed protruding inwards in the lateral direction at the front ends of the left jig 28A and the right jig 28B. Also, an insulating coating positioning portion 30 is formed protruding inward in the lateral direction at the rear ends of the left jig 28A and the right jig 28B. The electric cable 11 is held in a predetermined position at the time of ultrasonic welding by the insulating coating 15 being held between the insulating coating positioning portion 30 of the left jig 28A and the insulating coating positioning portion 30 of the right jig 28B, as well as the core wire 14 being held between the core wire positioning portion 29 of the left jig 28A and the core wire positioning portion 29 of the right jig 28B.

The region between the core wire positioning portion 29 and the insulating coating positioning portion 30 is provided with a gap in the lateral direction. The width of the gap in the lateral direction is formed to be larger than the width in the lateral direction of the horn 19. At the time of ultrasonic welding, the horn 19 is inserted into this gap from above and interference between the horn 19 and the positioning jig 28 is avoided.

9. An Example of the Welding Process

Figure 9:
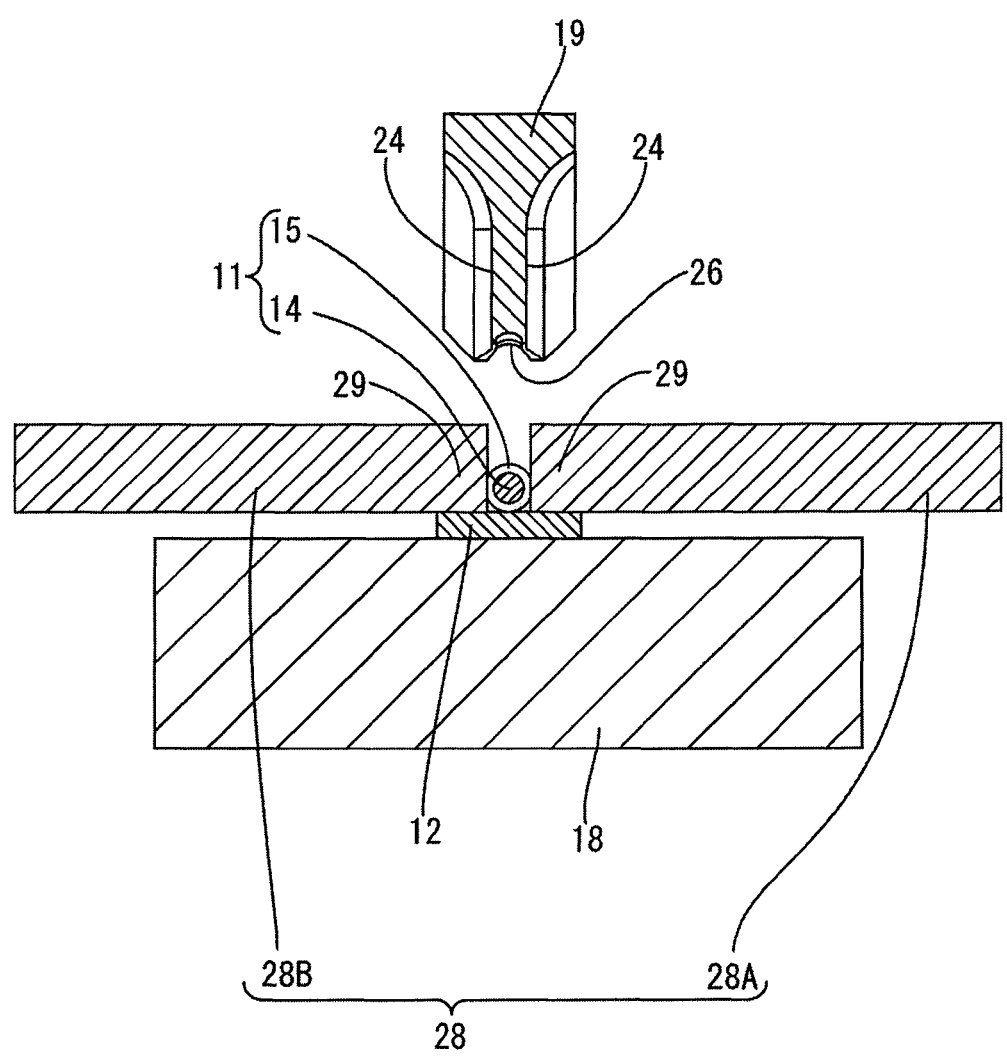
FIG. 9 is a sectional view taken along line IX-IX in FIG. 7.

The following describes an example of the welding process of the electric cable 11 and the terminal 12. An end of the electric cable 11 has the insulating coating 15 stripped to expose the core wire 14. As shown in FIGS. 7 to 9, the exposed core wire 14 is placed on the terminal 12, and the terminal 12 with the core wire 14 placed upon it is then placed on the anvil 18.

The left and right positioning jigs 28 are moved inward in the lateral direction, and the core wire 14 of the electric cable 11 is clamped by the core wire positioning portion 29 while the insulating coating 15 of the electric cable 11 is clamped by the insulating coating positioning portion 30 (see FIG. 11).

Figure 10:
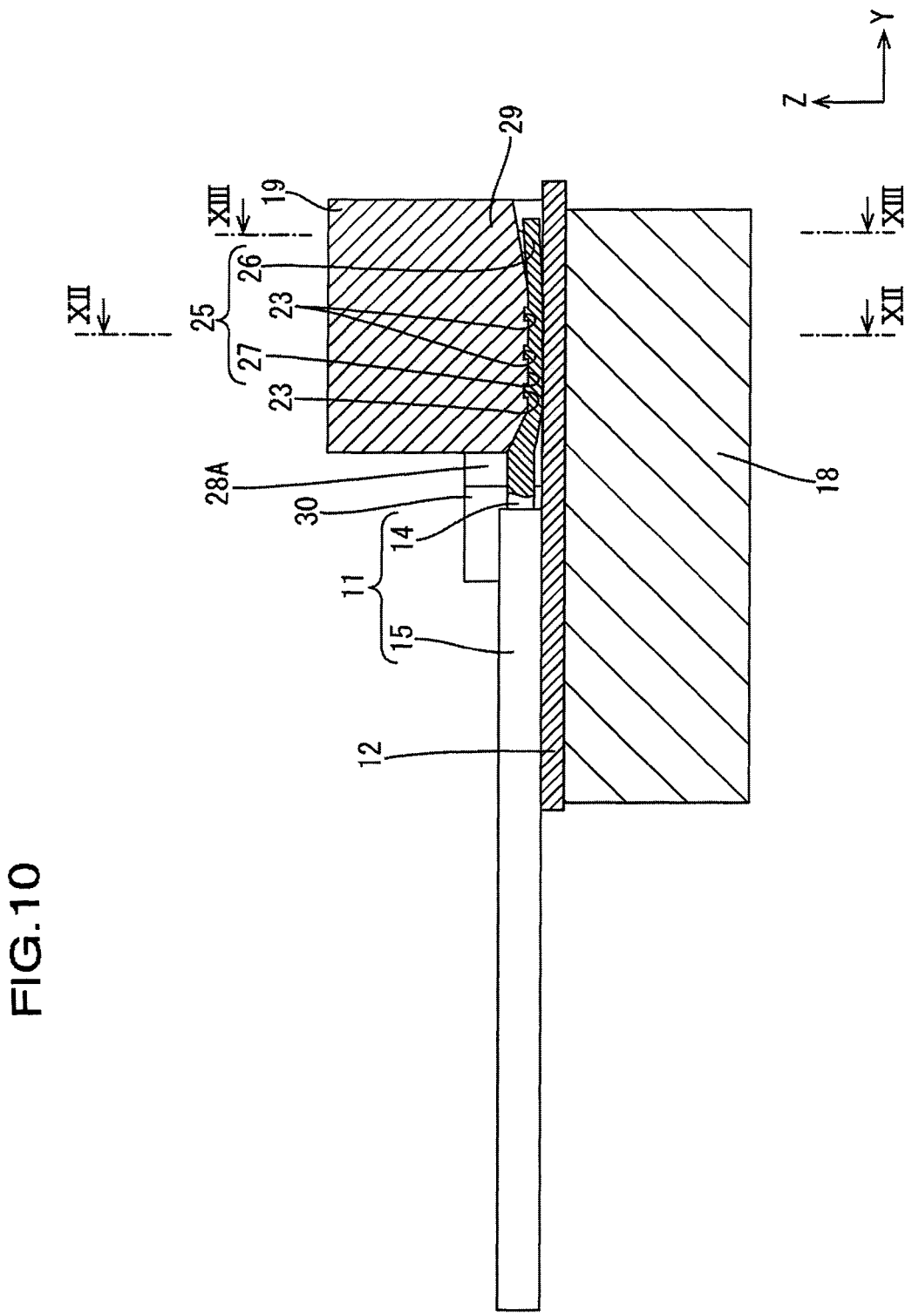
FIG. 10 is a sectional view showing a state in which the core wire and the terminal are being ultrasonic welded.

As shown in FIG. 10, the horn 19 is moved to face the core wire 14 from above and the recess 25 of the horn 19 abuts the core wire 14 from above. The terminal 12 and the core wire 14 are clamped between the anvil 18 and the horn 19 by the horn 19 being moved further downwards. A predetermined pressure is applied to the core wire 14 by the low pressure application portion 26 and the high pressure application portion 27, which are provided in the recess 25 of the horn 19 (see FIGS. 12 and 13).

The pressure that is applied to the core wire 14 by the high pressure application portion 27 is greater than the pressure that is applied to the core wire 14 by the low pressure application portion 26.

The core wire 14 and the terminal 12 are welded with frictional heat that is generated by ultrasonic vibration being imparted from the horn 19 to the core wire 14.

10. Effects of the Present Embodiment

The following describes the effects of the present embodiment. In the electric cable with terminal 10 according to the present embodiment, an end of an electric cable 11 is connected to a terminal 12. The electric cable 11 has a core wire 14 that is a bundle of a plurality of wire strands 13. The terminal 12 has a connection portion 17 that is connected to the core wire 14 that is exposed at the end of the electric cable 11. The core wire 14 that is placed on the connection portion 17 has a welded portion 16 that is ultrasonic welded to the connection portion 17. The welded portion 16 has a high compression portion 21 where the core wire 14 is compressed, and a low compression portion 20 where a position that is closer to the end of the core wire 14 than the high compression portion 21 is compressed at a compression (pressure) lower than that of the high compression portion 21.

Also, a method for manufacturing the electric cable with terminal 10 according to the present specification includes placing a core wire 14 of an electric cable 11 that has a bundle of a plurality of wire strands 13 on a connection portion 17 of the electric cable with terminal 10; sandwiching the connection portion 17 on which the core wire 14 is placed between the horn 19 and the anvil 18 and applying ultrasonic vibration, forming a high compression portion 21 in the core wire 14 by applying comparatively high pressure; and forming a low compression portion 20 in the core wire 14 by applying comparatively low pressure at a position that is closer to the end of the core wire than the high compression portion 21.

According to the above configuration, the core wire 14 is firmly connected to the terminal 12 in the high compression portion 21. Also, in a low compression portion 20, the core wire 14 is welded in a state in which less pressure is applied than at the high compression portion 21. Through this, in the low compression portion 20, as a result of the wire strands 13 being mutually welded together, even if one wire strand 13 breaks, the shedding of wire strands from the core wire 14 can be suppressed because the broken wire is welded to the other wire strands 13.

Also, according to the present embodiment, the compression of the low compression portion 20 is continuously reduced with increasing distance from the high compression portion 21.

With this configuration, the pressure that is applied to the core wire 14 between the high compression portion 21 and the low compression portion 20 gradually changes. Through this, the shedding of the wire strands 13 can be further suppressed by suppressing the breaking of the wire strands 13 in the border region of the high compression portion 21 and the low compression portion 20.

According to the above embodiment, an end of the core wire 14 that is placed on the connection portion 17 is clamped by the core wire positioning portion 29 from the direction that intersects the direction in which the horn 19 presses down the core wire 14. Through this, the core wire 14 can be positioned at the time of ultrasonic welding the core wire 14 and the terminal 12.

According to the present embodiment, the outer periphery of the core wire 14 is covered by an insulating coating 15, and in a state in which the core wire 14 is placed on the connection portion 17, the insulating coating 15 is clamped by an insulating coating positioning portion 30 from a direction that intersects the direction in which the horn 19 presses down the core wire 14. Through this, it is possible to accurately position the core wire 14 at the time of ultrasonic welding the core wire 14 and the terminal 12 because it is possible to also position the portion of the core wire 14 that is covered by the insulating coating 15.

Second Embodiment

Figure 14:
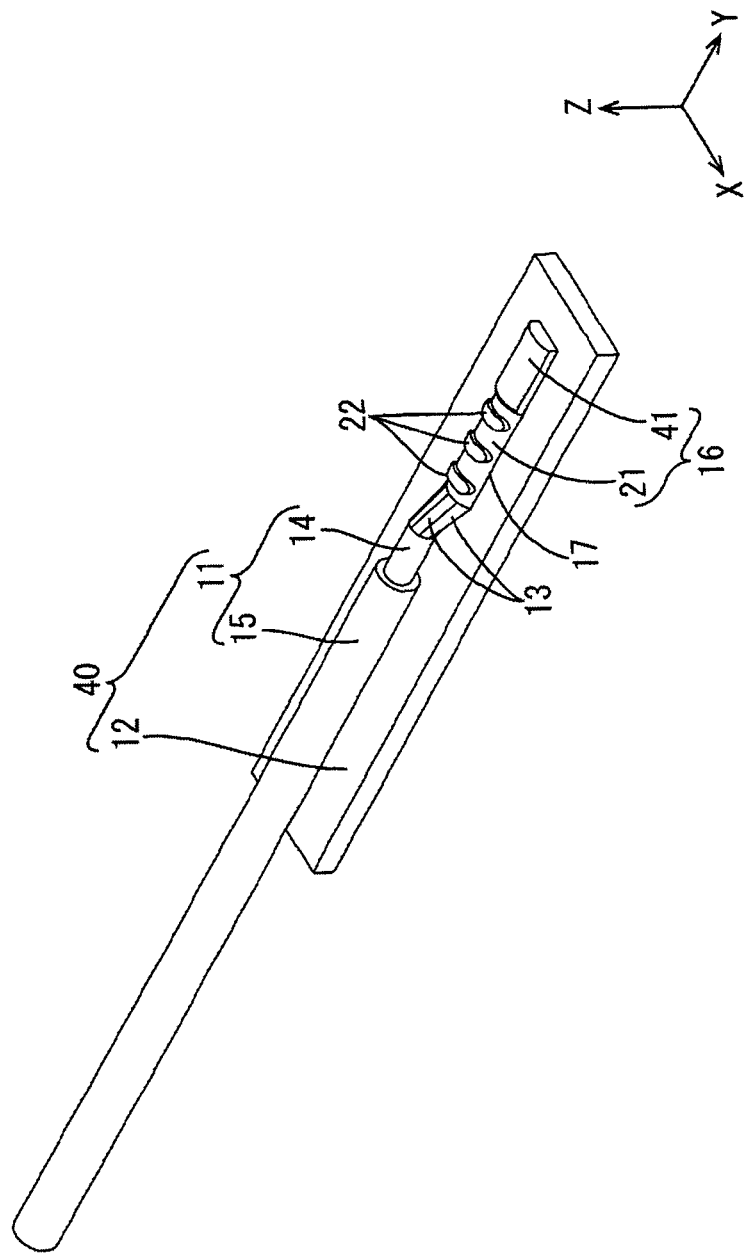
FIG. 14 is a perspective view showing the electric cable with terminal according to a second embodiment.
Figure 15:
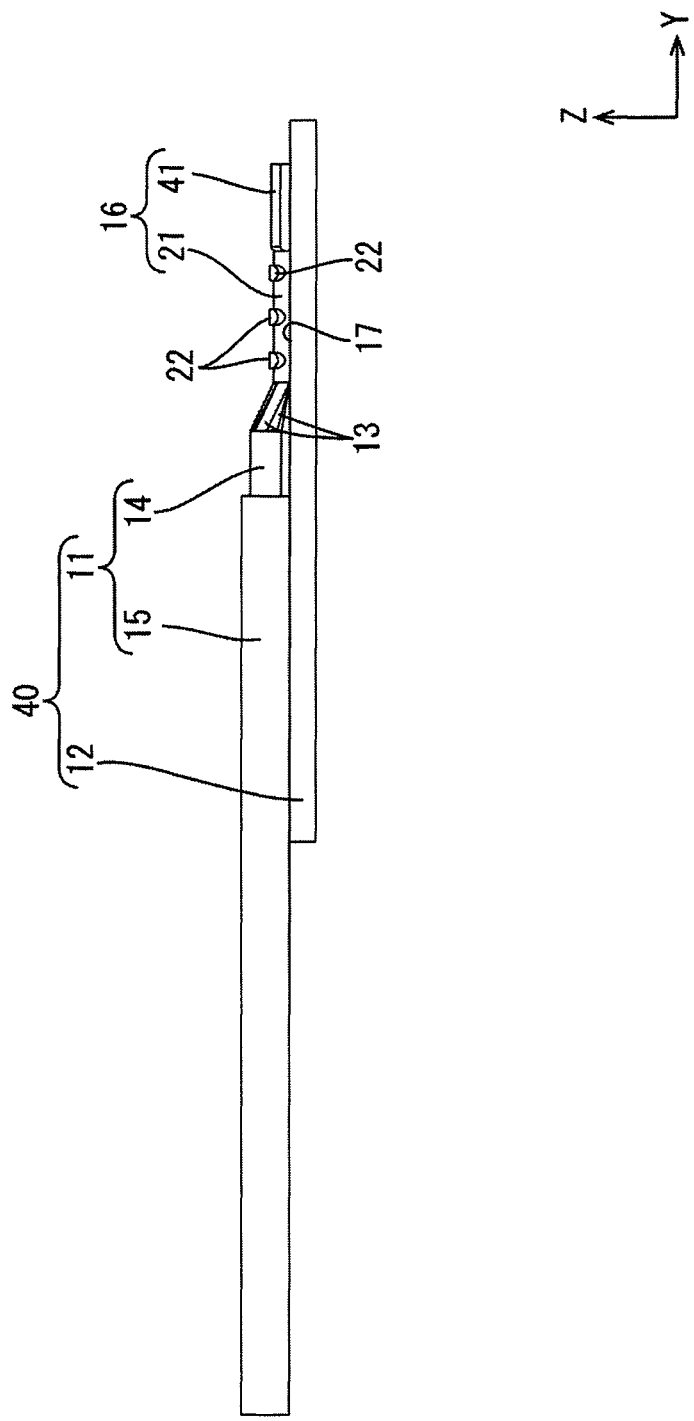
FIG. 15 is a side view showing the electric cable with terminal.

The following describes an electric cable with terminal 40 according to the second embodiment with reference to FIG. 14 and FIG. 15. According to the present embodiment, a low compression portion 41 that is formed on the core wire 14 is formed to have the same height from the upper surface of the terminal 12 in the longitudinal direction. The height of the low compression portion 41 from the upper surface of the terminal 12 is set to be higher than the height of the high compression portion 21 from the upper surface of the terminal 12. Pressure applied to the core wire 14 is different at the two stages of the high compression portion 21 and the low compression portion 41.

Configurations other than those described above are similar to those of the first embodiment, and therefore the same members are denoted by the same reference numerals and redundant descriptions are omitted.

According to the above configuration, it is possible to keep the wire strands 13 from breaking in the border region of the high compression portion 21 and the low compression portion 41. Thus, it is possible to suppress the shedding of the wire strands 13.

Third Embodiment

Figure 16:
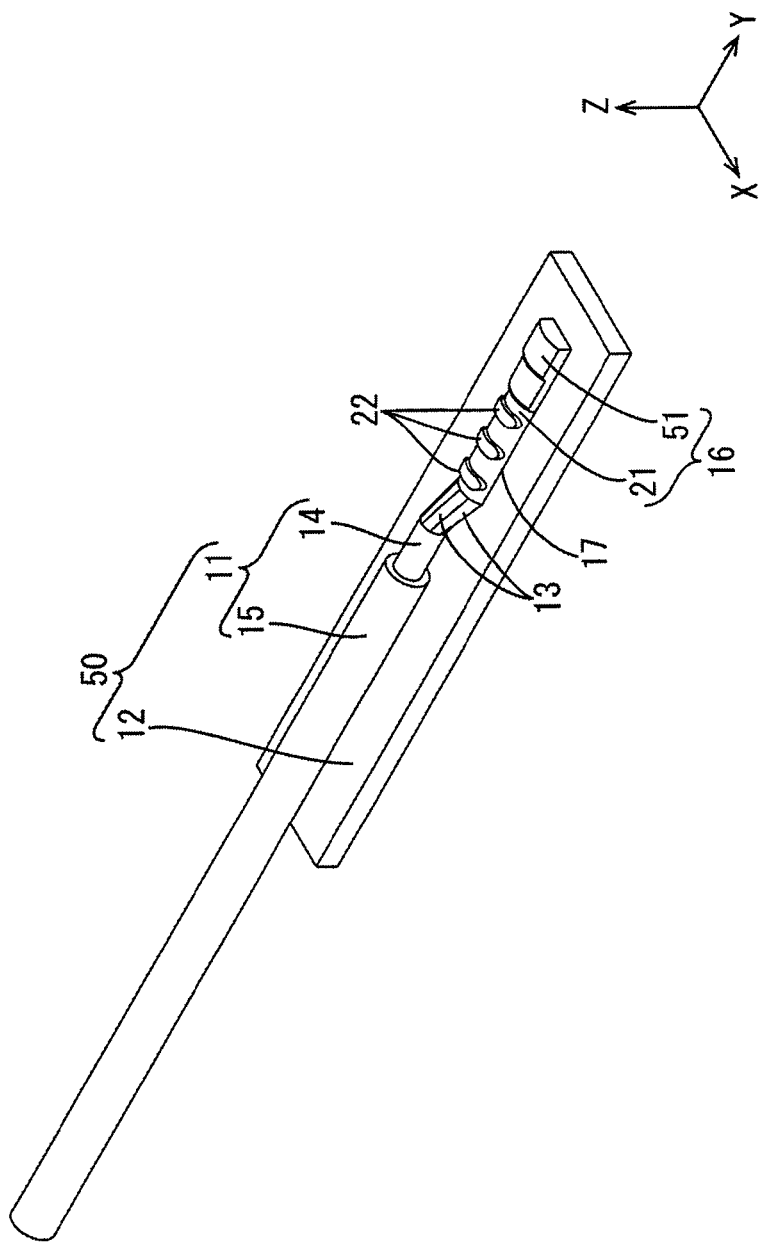
FIG. 16 is a perspective view showing the electric cable with terminal according to a third embodiment.

The following describes an electric cable with terminal 50 according to the third embodiment with reference to FIG. 16 and FIG. 17. In the present embodiment, a low compression portion 51 is provided with a protruding height that increases stepwise from the terminal 12 with increasing distance from the high compression portion 21. In other words, when viewed from the side, the upper portion of the low compression portion 51 becomes higher stepwise in the forward direction. Through this, in the low compression portion 51, the compression is reduced with increasing distance from the high compression portion 21.

Configurations other than those described above are similar to those of the first embodiment, and therefore the same members are denoted by the same reference numerals and redundant descriptions are omitted.

According to the above configuration, the pressure that is applied in the low compression portion 51 to the core wire 14 decreases stepwise. Thus, it is possible to further suppress the shedding of the wire strands 13 because the breaking of the wire strands 13 in the low compression portion 51 is suppressed.

Other Embodiments

The technique disclosed in the present specification is not limited to the above embodiments described with reference to the drawings, and, for example, also the following embodiments are included within the technical scope of the technique disclosed in the present specification.

(1) In the above embodiments, the left jig 28A and the right jig 28B that constitute the positioning jig 28 are each configured to have a core wire positioning portion 29 and an insulating coating positioning portion 30, but the present application is not limited to this, and a core wire positioning portion 29 member that has a core wire positioning portion 29 and an insulating coating positioning portion 30 member that has an insulating coating positioning portion 30 may be provided as separate members.

(2) In the embodiments above, the positioning jig 28 is used to position the electric cable 11 at the time of ultrasonic welding, but ultrasonic welding of the electric cable 11 and the terminal 12 without use of the positioning jig 28 is also possible.

(3) In the third embodiment, there are two steps formed in the low compression portion 51, but the present application is not limited to this, and there may also be three or more steps formed in the low compression portion 51.

LIST OF REFERENCE NUMERALS

10, 40, 50: Electric cable with terminal
11: Electric cable
12: Terminal
13: Wire strand
14: Core wire
15: Insulating coating
16: Welded portion
17: Connection portion
18: Anvil
19: Horn
20, 41, 51: Low compression portion
21: High compression portion
29: Core wire positioning portion
30: Insulating coating positioning portion

What is claimed is:

1. An electric cable with terminal in which an end of an electric cable is connected to a terminal,
    the electric cable comprising a core wire that is a bundle of a plurality of wire strands, and
    the terminal comprising a connection portion that is connected to the core wire that is exposed at the end of the electric cable,
    wherein the core wire comprises a segment of the bundle of the plurality of the wire strands that is spaced apart from the terminal, and a welded portion in which the core wire placed on the connection portion is ultrasonically welded to the connection portion, the welded portion being located at a position closer to an end of the core wire than the segment is,
    the welded portion comprises a high compression portion where the core wire is compressed, and a low compression portion where the core is compressed at a compression that is lower than that of the high compression portion, the low compression portion being located at a position that is closer to the end of the core wire than the high compression portion is, and
    the segment is provided with an inclined portion in which an outer circumferential surface of the bundle of the plurality of the wire strands is continuously and obliquely inclined with respect to a longitudinal direction of the terminal, and the inclined portion is compressed.

2. The electric cable with terminal according to claim 1 wherein the compression of the low compression portion is continuously reduced with increasing distance from the high compression portion.

3. The electric cable with terminal according to claim 1 wherein the compression of the low compression portion is reduced stepwise with increasing distance from the high compression portion.

4. A method for manufacturing the electric cable with the terminal according to claim 1, comprising:
    placing the core wire of the electric cable that has the bundle of the plurality of the wire strands on the connection portion of the electric cable with the terminal;
    sandwiching the end of the core wire placed on the connection portion from a direction that intersects a direction in which a horn presses down the core wire, using core wire positioning portions each provided in a positioning jig;
    applying ultrasonic vibration to the connection portion on which the core wire is placed while sandwiched between the horn and an anvil;
    forming the high compression portion by applying comparatively high pressure to a portion of the core wire different from the portion sandwiched by the core wire positioning portions; and
    forming the low compression portion by applying comparatively low pressure at a position that is closer to the end of the core wire than the high compression portion is in the portion of the core wire that is sandwiched by the core wire positioning portions.

5. A method for manufacturing the electric cable with the terminal according to claim 1, comprising:
    placing the core wire of the electric cable that has the bundle of the plurality of the wire strands and an insulating coating that covers an outer periphery of the core wire on the connection portion of the electric cable with the terminal;
    sandwiching the end of the core wire placed on the connection portion from a direction that intersects a direction in which a horn presses down the core wire, using core wire positioning portions each provided in a positioning jig;
    sandwiching the insulating coating in a state where the core wire is placed on the connection portion from the direction that intersects the direction in which the horn presses down the core wire, using insulating coating positioning portions provided in the positioning jig so as to be spaced apart from the core wire positioning portions;
    applying ultrasonic vibration to the connection portion on which the core wire is placed while sandwiched between the horn and an anvil;
    forming the high compression portion by applying comparatively high pressure to a portion of the core wire located between the portion sandwiched by the core wire positioning portions and the insulation coating; and
    forming the low compression portion by applying comparatively low pressure at a position that is closer to the end of the core wire than the high compression portion is in the portion of the core wire that is sandwiched by the core wire positioning portions.

6. The electric cable with terminal according to claim 1 wherein the low compression portion includes an inclined portion that is continuously and obliquely inclined with respect to a longitudinal direction of the terminal.

* * * * *